(12) United States Patent
Waggoner

(10) Patent No.: US 10,479,003 B2
(45) Date of Patent: Nov. 19, 2019

(54) SOLID STATE MICROCELLULAR FOAMING METHOD INCLUDING CONTINUOUS SATURATION OF SOLID POLYMERIC MATERIAL

(71) Applicant: DART CONTAINER CORPORATION, Mason, MI (US)

(72) Inventor: Michael Waggoner, Seattle, WA (US)

(73) Assignee: Dart Container Corporation, Mason, MI (US)

(*) Notice: Subject to any disclaimer, the term of this patent is extended or adjusted under 35 U.S.C. 154(b) by 220 days.

(21) Appl. No.: 15/248,091

(22) Filed: Aug. 26, 2016

(65) Prior Publication Data

US 2017/0056842 A1  Mar. 2, 2017

Related U.S. Application Data

(60) Provisional application No. 62/212,251, filed on Aug. 31, 2015.

(51) Int. Cl.
| | | |
|---|---|---|
| *B29C 44/34* | (2006.01) | |
| *B29B 13/00* | (2006.01) | |
| *C08J 9/12* | (2006.01) | |
| *B29L 7/00* | (2006.01) | |

(52) U.S. Cl.
CPC .......... *B29C 44/3453* (2013.01); *B29B 13/00* (2013.01); *C08J 9/122* (2013.01); *B29C 44/358* (2013.01); *B29L 2007/00* (2013.01); *B29L 2007/007* (2013.01); *C08J 2203/06* (2013.01); *C08J 2300/22* (2013.01)

(58) Field of Classification Search
CPC ................................................. B29C 44/3453
See application file for complete search history.

(56) References Cited

U.S. PATENT DOCUMENTS

| | | | | |
|---|---|---|---|---|
| 1,487,362 A | | 3/1924 | Rice | |
| 2,963,001 A | | 12/1960 | Alexander | |
| 3,175,375 A | * | 3/1965 | Yazawa | D06B 3/02 19/66 R |
| 3,213,470 A | * | 10/1965 | Yasawa | D06B 3/02 264/182 |
| 3,241,343 A | * | 3/1966 | Yazawa | D06B 3/045 19/66 R |
| 3,349,578 A | * | 10/1967 | Greer | D06B 23/18 34/242 |
| 4,284,596 A | | 8/1981 | Inokuchi et al. | |

(Continued)

FOREIGN PATENT DOCUMENTS

| | | |
|---|---|---|
| GB | 1186091 A | 4/1970 |
| WO | 2001057120 A2 | 8/2001 |
| WO | 2006100517 A1 | 9/2006 |

OTHER PUBLICATIONS

European Search Report for Counterpart EP16186059.8, dated Mar. 23, 2017.

*Primary Examiner* — Abbas Rashid
(74) *Attorney, Agent, or Firm* — McGarry Bair PC

(57) ABSTRACT

A method for saturating a thermoplastic polymer material includes continuously moving the polymer material through a pressurized pressure vessel. To do this, the method includes sealing the pressure vessel with a series of dynamic seals that allows the polymer material to continuously move through the pressure vessel while maintaining the pressure inside the pressure vessel.

20 Claims, 2 Drawing Sheets

(56) References Cited

U.S. PATENT DOCUMENTS

| | | | |
|---|---|---|---|
| 4,473,665 A | 9/1984 | Martini-Vvedensky et al. | |
| 4,761,256 A | 8/1988 | Hardenbrook et al. | |
| 5,076,293 A | 12/1991 | Kramer | |
| 5,158,986 A | 10/1992 | Cha et al. | |
| 5,684,055 A | 11/1997 | Kumar et al. | |
| 5,707,573 A | 1/1998 | Biesenberger et al. | |
| 5,931,972 A * | 8/1999 | Foster | D02J 13/006 68/5 D |
| 6,139,588 A * | 10/2000 | Foster | D02J 13/006 68/5 D |
| 6,652,654 B1 * | 11/2003 | Propp | B05D 1/025 118/419 |
| 6,811,059 B2 * | 11/2004 | Piucci, Jr. | B05B 7/0408 222/148 |
| 7,559,554 B2 | 7/2009 | Hogg et al. | |
| 8,778,462 B2 * | 7/2014 | Brabbs | B05D 3/04 427/250 |
| 8,839,492 B2 * | 9/2014 | Mizutori | D01F 6/18 19/66 R |
| 8,858,849 B2 | 10/2014 | Nadella et al. | |
| 2009/0309250 A1 | 12/2009 | Nadella et al. | |
| 2016/0045879 A1 | 2/2016 | Kumar et al. | |

\* cited by examiner

SOLID STATE MICROCELLULAR FOAMING METHOD INCLUDING CONTINUOUS SATURATION OF SOLID POLYMERIC MATERIAL

CROSS-REFERENCE TO RELATED APPLICATIONS

The present application claims the benefit of U.S. Provisional Patent Application No. 62/212,251, filed Aug. 31, 2015, which is incorporated by reference herein in its entirety.

FIELD OF THE DISCLOSURE

Saturation of plastic is typically achieved by placing the plastic in a high pressure gas environment (inside a pressure vessel) for an amount of time so that the plastic can absorb some of the gas. The system and method disclosed herein allows continuous saturation of plastic, which can be, for example, a polymer or polymeric material, by placing a series of dynamic seals at each end of a pressure vessel. Plastic polymer material enters the pressure vessel via the system of seals, and exits the pressure vessel saturated with gas via a system of seals.

BACKGROUND

Solid-state microcellular processing is a well-known art involving a two-stage batch process. In the first stage (absorption), a solid polymer is saturated with high pressure inert gas (e.g., $CO_2$) in a pressure vessel until a desired gas concentration level is achieved throughout the polymer matrix. Once the gas-polymer mixture is removed from the pressure vessel into ambient environment (desorption), a supersaturated specimen is produced that is thermodynamically unstable due to the excessive diffusion of gas into the polymer. In the second stage (foaming), the gas-polymer mixture is heated in a hot water bath or some other heating medium (non-limiting examples of which include hot air, steam, infrared radiation, etc.) at a temperature close to the glass transition temperature (Tg) of the gas-polymer mixture in order to induce microcellular bubble nucleation and growth.

Saturation of polymer rolls requires placement of an interleaving layer between layers of polymer, to allow gas to enter the surface of the polymer evenly. The addition of this layer is an added process step, and the removal of the interleavement is yet another process step.

Repeated opening and closing of pressure vessels wastes large amounts of high pressure gas, and also creates pauses in plastic processing. A roll that is removed from a pressure vessel begins to lose gas immediately. Gas diffuses out into the atmosphere from the exterior of the roll first and the interior of the roll last. Hence, there may be difficulty achieving consistent foaming behavior throughout the roll, particularly in polymers that lose gas quickly.

U.S. Pat. No. 5,158,986 discloses a method of passing an extruded thermoplastic material from a gas-saturation chamber to a foaming chamber via a time-controlled system of rollers. Dynamic seals are stationed between the chambers to allow passage of the thermoplastic sheet while preserving the environmental conditions of each chamber. To date, however, there is no engineering solution for manufacturing a dynamic seal that can operate at pressures required for practicing the art referenced in this current patent.

BRIEF SUMMARY

In one aspect, illustrative embodiments in accordance with the present disclosure relate to a method of saturating a polymeric material with pressurized gas in a pressure vessel. The method comprises continuously passing a solid polymeric material through a first set of cascading seals at an inlet to the pressure chamber, exposing the solid polymeric material passing through the pressure vessel to pressurized inert gas to form a saturated solid polymeric material, and continuously passing the saturated solid polymeric material through a second set of cascading seals at an outlet to the pressure chamber.

In another aspect, illustrative embodiments in accordance with the present disclosure relate to a system for saturating a solid polymeric material with gas. The system comprises a pressure vessel defining an interior and having an inlet and an outlet fluidly coupled to the interior. The pressure vessel further comprises a pump fluidly coupled to the interior to supply pressurized gas to the interior, a first set of cascading seals fluidly sealing the inlet, and a second set of cascading seals fluidly sealing the outlet.

DETAILED DESCRIPTION

Figure 2:
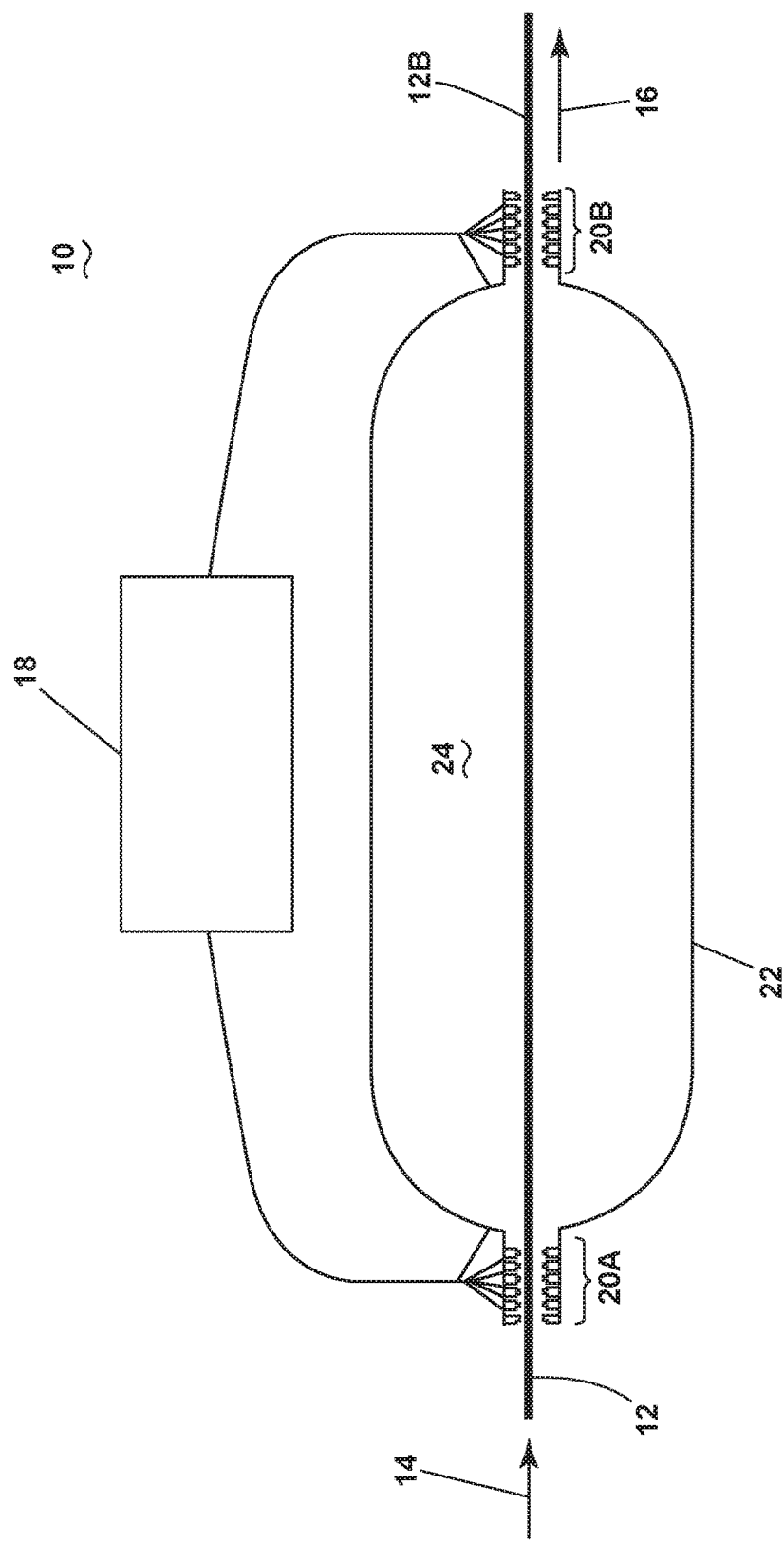
FIG. 2 is a schematic view of a polymer saturation system according to an embodiment of the present disclosure.

FIG. 2 is a schematic illustration showing a polymer saturation system 10 incorporating the cascading seals 20A, 20B. A polymer or polymeric material 12 enters the system 10, more specifically entering an interior 24 of a pressure vessel 22, at one end (from the left side of the drawing), illustrated by arrow 14, and exits as a saturated polymer material 12B at the other end (to the right of the drawing), illustrated by arrow 16. Pressure in each section of the system 10 may be maintained by a pressure regulation system 18. This pressure regulation system 18 could either be, by way of non-limiting example, an external gas source that adds high pressure gas to the system (while excess gas pressure is vented), or an active pump system that both pressurizes and depressurizes one or more sections of the system 10.

Figure 1:
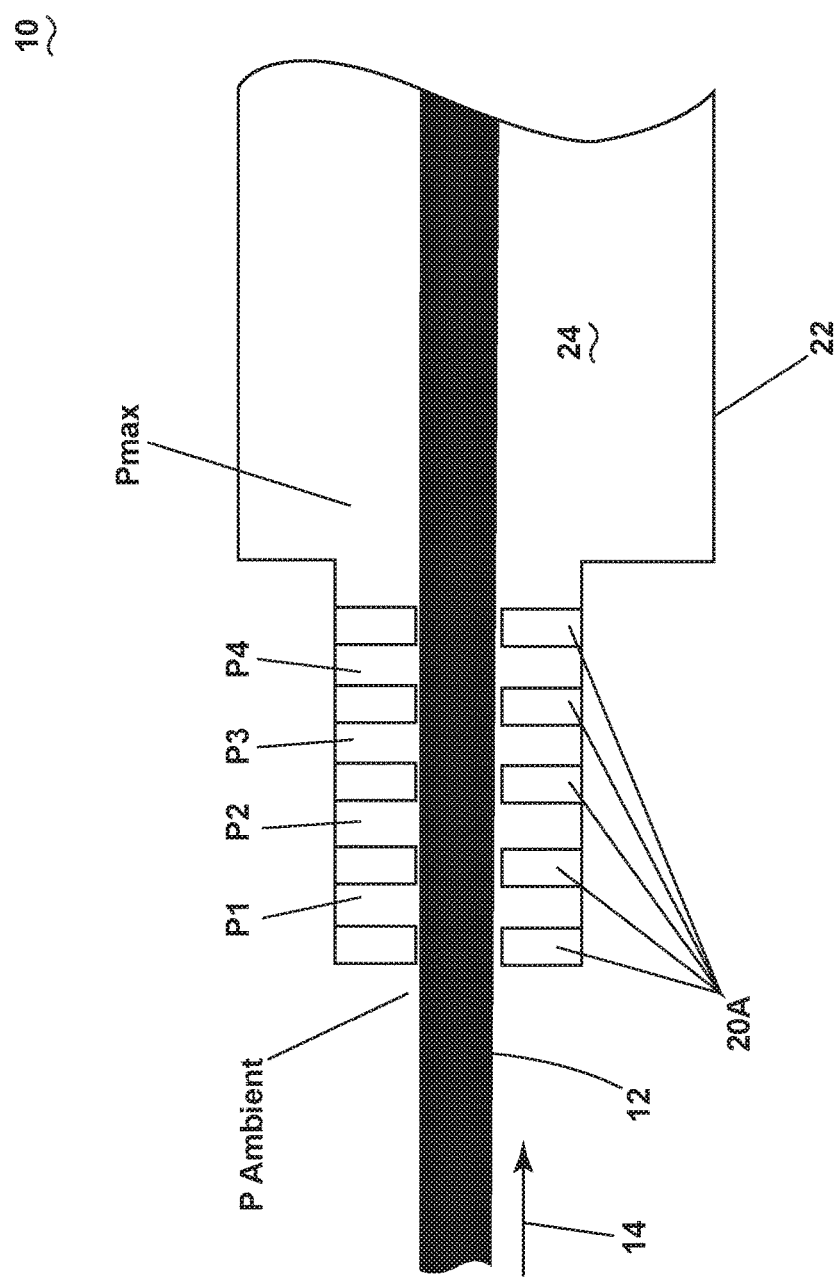
FIG. 1 is a schematic view of a series of dynamic seals that can be included in a polymer saturation system of FIG. 2 according to an embodiment of the present disclosure.

FIG. 1 shows a schematic illustration of a series of dynamic seals 20A (cascading seals) and the pressure differential across each seal 20A as a portion of total pressure inside the interior 24 of the pressure vessel 22. Polymer material 12 enters the series of dynamic seals 20A (from the left side of the illustration, as illustrated by arrow 14), and then exits the dynamic seals to enter into the interior 24 of the pressure vessel 22. Pressures P1, P2, P3, and P4 are each a fraction of the total difference in pressure between P ambient and Pmax, and are maintained at their required pressure P1, P2, P3 and P4, respectively, by a pressure regulation system 18 (FIG. 2), which can be, in non-limiting example, an external system of pumps or other source of high pressure gas. For example, in a pressure vessel 22 containing 500 psig, each seal 20A might be used to maintain a pressure differential of 100 psi. P1 would equal 100 psig, P2 would equal 200 psig, P3 would equal 300 psig, P4 would equal 400 psig and Pmax would equal 500 psig. In other embodiments, the total number of seals 20A included in the series of dynamic seals 20A may be more or less than five. In addition, the pressure differential across each seal 20A may not be equal. For example, in order to reduce the amount of gas that escapes into the environment, it may be desirable to maintain P1 at a low level, such as 5 psig, and to maintain the P2 at a higher level, such as 50 psig. The total number of seals 20A required could also be determined by the maximum pressure differential allowable across each seal 20A. A similar system of seals 20B (FIG. 2) may be used on the exit end.

A method for continuous processing of a polymer material 12, non-limiting examples of which can include polymer sheets, rods, fibers, or any continuous thermoplastic part, includes using a pressure vessel 22 having cascading seals 20A, 20B on each end to maintain substantial pressure inside the interior 24 of the pressure vessel 22 while the polymer material 12 moves through the interior 24 of the pressure vessel 22. The cascading seals 20A, 20B, which allow the plastic to enter a high pressure environment, include a series of dynamic seals 20A, 20B, each operating at a differential pressure which is only a fraction of the total pressure (Pmax) in the interior 24 of the pressure vessel 22. The saturation system 10 could be placed in series after a roll of plastic polymer material 12 or after an extruder whereby the plastic polymer material is taken up by the saturation system 10 as according to the schematics in FIG. 2. The saturation system 10 can also be placed before any plastic polymer material processing equipment or machinery, including, by way of non-limiting example, an air oven, thermoformer, and material uptake machine, that may be used to process or store the saturated polymer material 12B.

To the extent not already described, the different features and structures of the various embodiments can be used in combination with each other as desired. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described.

While the present disclosure has been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A solid state microcellular foaming method that includes saturating a solid polymeric material with a pressurized inert gas in a pressure vessel, the method comprising:
    continuously passing the solid polymeric material through a first set of cascading seals fluidly sealing an inlet to the pressure vessel;
    exposing the solid polymeric material passing through an interior of the pressure vessel to the pressurized inert gas to form a saturated solid polymeric material, wherein the inert gas in the saturated solid polymeric material forms microcellular bubbles in the saturated solid polymeric material in a subsequent foaming stage;
    continuously passing the saturated solid polymeric material through a second set of cascading seals fluidly sealing an outlet to the pressure vessel; and
    operating a pressure regulation system to control the pressure across each of the first set of cascading seals, the second set of cascading seals, and the interior of the pressure vessel.

2. The method of claim 1 wherein the solid polymeric material comprises at least one of a sheet, rod, or fiber.

3. The method of claim 2 wherein the solid polymeric material comprises a sheet.

4. The method of claim 1 wherein passing the solid polymeric material through the first set of cascading seals comprises sequentially increasing the pressure at each of the seals in the first set of cascading seals.

5. The method of claim 4 wherein passing the solid polymeric material through the second set of cascading seals comprises sequentially decreasing the pressure at each of the seals in the second set of cascading seals.

6. The method of claim 1 wherein a pressure differential across each seal in at least one of the first or second set of cascading seals is equal.

7. The method of claim 1 wherein a pressure differential across each seal in at least one of the first or second set of cascading seals is not equal.

8. The method of claim 1 wherein the pressurized inert gas is carbon dioxide.

9. The method of claim 1 wherein the pressurized inert gas is 500 psig.

10. The method of claim 1 wherein the solid polymeric material is at least one of fed from a roll as it passes into the inlet or is taken up on a roll after it passes from the outlet.

11. The method of claim 1 further comprising, prior to passing the solid polymeric material through the first set of cascading seals, extruding a plastic polymeric material to form the solid polymeric material.

12. The method of claim 1 further comprising, subsequent to passing the saturated solid polymeric material through the outlet of the pressure vessel, passing the saturated solid polymeric material to a foaming stage to induce microcellular bubble nucleation and growth.

13. The method of claim 12 wherein the foaming stage includes heating the saturated solid polymeric material.

14. The method of claim 1 wherein the interior of the pressure vessel is free of seals.

15. The method of claim 1 wherein the pressure regulation system comprises an external gas source that adds high pressure gas to the pressure vessel.

16. The method of claim 1 wherein the pressure regulation system comprises an active pump system that both pressurizes and depressurizes one or more sections of the pressure vessel.

17. The method of claim 16 wherein the one or more sections of the pressure vessel includes one or more of the first set of cascading seals, the second set of cascading seals, and the interior of the pressure vessel.

18. A solid state microcellular foaming method that includes saturating a sheet of solid thermoplastic polymeric material with a pressurized inert gas in a pressure vessel, the method comprising:
    continuously passing the sheet of solid thermoplastic polymeric material through a first set of cascading seals fluidly sealing an inlet to the pressure vessel;
    exposing the sheet of solid thermoplastic polymeric material passing through an interior of the pressure vessel to the pressurized inert gas to form a saturated sheet of solid thermoplastic polymeric material, wherein the inert gas in the saturated sheet of solid thermoplastic polymeric material forms microcellular bubbles in the saturated sheet of solid thermoplastic polymeric material in a subsequent foaming stage;

continuously passing the saturated sheet of solid thermoplastic polymeric material through a second set of cascading seals fluidly sealing an outlet to the pressure vessel; and operating a pressure regulation system to control the pressure across each of the first set of cascading seals, the second set of cascading seals, and the interior of the pressure vessel.

19. A solid state microcellular foaming method that includes saturating a solid polymeric material with a pressurized inert gas in a pressure vessel, the method comprising:

continuously passing the solid polymeric material through a first set of cascading seals fluidly sealing an inlet to the pressure vessel;

exposing the solid polymeric material passing through an interior of the pressure vessel to the pressurized inert gas to allow continuous saturation and to form a saturated solid polymeric material, wherein the inert gas in the saturated solid polymeric material forms microcellular bubbles in the saturated solid polymeric material in a subsequent foaming stage;

continuously passing the saturated solid polymeric material through a second set of cascading seals fluidly sealing an outlet to the pressure vessel; and operating a pressure regulation system to control the pressure across each of the first set of cascading seals, the second set of cascading seals, and the interior of the pressure vessel.

20. The method of claim 19 wherein the continuously passing the solid polymeric material through the first set of cascading seals and the second set of cascading seals reduces an amount of the pressurized inert gas that escapes from the pressure vessel.

* * * * *